United States Patent [19]

Baumann

[11] Patent Number: 5,248,430
[45] Date of Patent: Sep. 28, 1993

[54] METALIZED AMMONIUM SALTS OF CONDENSATES OF SULPHO GROUP CONTAINING AROMATIC COMPOUNDS WITH DIHYDROXYDIPHENYL-SULPHONE

[75] Inventor: Hans-Peter Baumann, Ettingen, Switzerland

[73] Assignee: Sandoz Ltd., Basel, Switzerland

[21] Appl. No.: 538,366

[22] Filed: Jun. 14, 1990

[30] Foreign Application Priority Data

Jun. 14, 1989 [DE] Fed. Rep. of Germany ....... 3919357
Jun. 14, 1989 [DE] Fed. Rep. of Germany ....... 3919358

[51] Int. Cl.$^5$ .................. C14C 9/00; C07F 13/00; C07F 1/08; C07F 3/00
[52] U.S. Cl. ..................... 252/8.57; 8/560; 252/8.7; 556/45; 556/110; 556/118; 556/138; 568/28; 568/34
[58] Field of Search ............... 556/45, 110, 118, 138; 568/28, 34; 252/8.57, 8.7; 8/560

[56] References Cited

U.S. PATENT DOCUMENTS 4,218,366 8/1980 Kobayashi et al. ............... 528/143

FOREIGN PATENT DOCUMENTS 1291784 10/1972 United Kingdom .

Primary Examiner—José G. Dees
Assistant Examiner—Porfirio Nazario
Attorney, Agent, or Firm—Robert S. Honor; Richard E. Vila; Thomas C. Doyle

[57] ABSTRACT

Ammonium salts of aromatic sulpho group-containing condensation products of at least one sulpho group-containing aromatic compound and at least one dihydroxydiphenylsulphone with formaldehyde or a formaldehyde-yielding compound or of defined starting mono- or oligosulphones which are partially metallized and compositions containing them, optionally together with UV-absorbers, are suitable as assistants in the treatment of various substrates and act in particular as improvers of the light-fastness of synthetic polyamide fibres and their dyeings, as assistants in the dyeing or tanning of leather and in the production of paper and as wood-preserving agents.

44 Claims, No Drawings

METALIZED AMMONIUM SALTS OF CONDENSATES OF SULPHO GROUP CONTAINING AROMATIC COMPOUNDS WITH DIHYDROXYDIPHENYL-SULPHONE

It has been found that particular ammonium salts of aromatic sulpho group-containing formaldehyde condensation products that contain in the molecule at least one dihydroxydiphenylsulfone radical, or of defined starting materials, which are partially metallized with copper, cobalt, nickel, manganese, zinc and/or magnesium and are defined below as products (S) and (S$_1$) are eminently suitable as assistants in the treatment of various substrates, in particular as improvers of the lightfastness of synthetic polyamides and their dyeings.

The invention relates to the new products (S), their production and use and the new starting products (W) and (S$_1$) and their use.

The invention, thus, provides a product (S) which is a partially metallized ammonium salt of a sulpho group-containing condensation product of A) at least one sulpho group-containing aromatic compound and B) at least one dihydroxydiphenylsulphone with C) formaldehyde or a formaldehyde-yielding compound, that is partially metallized with D) manganese, cobalt, nickel, zinc, magnesium and/or copper ions, or a mixture thereof.

The compounds defined above as "products (S)" are also referred to herein as "salts (S)", "ammonium salts (S)", partially metallized ammonium salts (S)", "assistants (S)" or just "(S)".

As component (A) are suitable in general any mono- or polycyclic aromatic sulphonic acids which are condensable under acidic conditions with formaldehyde and a dihydroxydiphenylsulphone, in particular such of the benzene and/or naphthalene series that do not contain other hetero atoms than oxygen and sulphur in the molecule, principally sulphonation products of xylene, anisol, diphenylether, ditolylether, naphthalene, tetrahydronaphthalene, biphenyl, diphenylene oxide, orthophenylphenol, di-(phenylether)-sulphone, poly-(phenylether)sulphone or optionally methyl-substituted dihydroxydiphenylsulfones, most preferably meta-xylene.

In particular also sulpho group-containing condensates, mainly from the (poly)condensation of sulphonation products of phenol, diphenyl(thio)ether and/or diphenylene oxide or sulphide which are optionally substituted by C$_{1-4}$-alkyl and/or -alkoxy and/or hydroxy, in particular aromatic mono- or oligosulphones, preferably such of the formulae

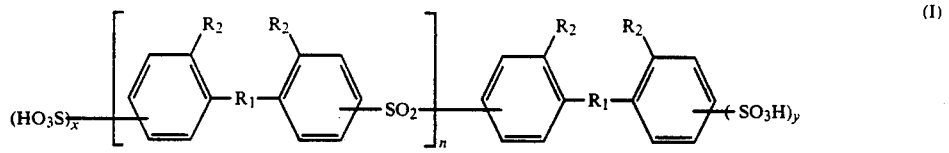

and

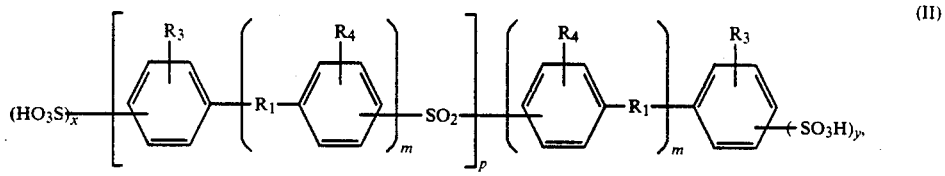

wherein the symbols R$_1$ signify independently from each other —O— or —S—, the symbols R$_2$ signify independently from each other hydrogen or two symbols R$_2$ on phenylene rings which are separated by R$_1$ form together a direct bond;

the symbols R$_3$ signify, independently from each other, hydrogen or methyl if m in the neighbouring group not separated by SO$_2$ signifies 1, or hydroxyl if m in the neighbouring groups signifies 0;

the symbols R$_4$ signify independently from each other hydrogen or methyl, the symbols m signify 0 or 1, the sum of all m's being at least 1, n signifies a number from 1–7, signifies a number from 3–7, and x and y signify, independently from each other, 0 or 1, provided that at least one of x and y signifies 1, the benzene rings in formula (I) are either further unsubstituted or bear a further substitutent selected from the group consisting of hydroxyl, C$_{1-4}$-alkyl and C$_{1-4}$-alkoxy and in formula (II) at least 25% of the symbols m signify 1, or mixtures thereof, may be employed as component (A).

In formula (I) two symbols R$_2$ linked to two phenylene rings separated by R$_1$ (which form an "R$_2$-pair") have the same significance; the respective R$_2$-pairs in formula (I) may, however, have the same or different significances; preferably all R$_2$ signify hydrogen. R$_3$ signifies preferably methyl if m=1. R$_4$ signifies preferably methyl. R$_1$ signifies preferably oxygen. The benzene rings in formula (I) are preferably further unsubstituted. Of the compounds of formulae (I) and (II) those of formula (I) are preferred.

As component (B) are suitable in general any dihydroxydiphenylsulphones as conventionally obtainable from the condensation of phenols, e.g. unsubstituted phenol and/or cresol, with sulphuric acid. Preferably compounds of the following formula

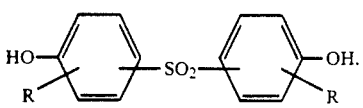
(III)

wherein the symbols R signify, independently from each other, hydrogen or methyl, are employed as component (B).

Advantageously as component (B) there are employed 4,4'-, 2,4'- or 2,2'-dihydroxydiphenylsulphone or 3,3'-dimethyl-4,4'-dihydroxydiphenylsulphone or also technical mixtures, in particular technical dihydroxydiphenylsulphone containing the 2,4'- and 4,4'-isomers as main components or technical dicresyl sulfone.

The products (S) of the invention may also be defined as ammonium and metal complex salts of polyaromatic, methylene bridge-containing sulphones, in which the aromatic rings are linked to each other by methylene and sulphone bridges and optionally ether-forming hetero atoms and/or direct links, in particular as such that contain one or more repeating units of the formula

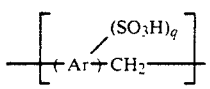
(a)

and of the formula

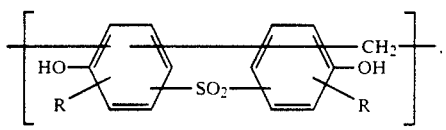
(b)

wherein the symbols
R signify, independently from each other, hydrogen or methyl,
Ar signifies the radical of an aromatic compound,
q signifies at least 1 and
metal signifies copper, nickel, manganese, cobalt, magnesium and/or zinc
or mixtures thereof with metal-free ammonium salts of the poly-aromatic, methylene bridge-containing sulphones.

The units of formula (a) derive, in particular, from the condensation with (C) of compounds (A) of formula

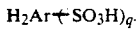
(IV)

The units of formula (b) derive in particular from the condensation with (C) of compounds (B) of formula (III).

The degree of sulphonation (i.e. the average number of sulpho groups per molecule) in the compounds (A) in particular of formula (IV) is chosen suitably so that the molecule contains at least one sulpho group. For monocycloaromatic compounds (A) the degree of sulphonation is advantageously in the range of 1-2, preferably 1-1.5. For polycycloaromatic compounds (A) it is advantageously not higher than the number of benzene rings in the molecule and is preferably in the range of 1-3, in particular 1-2. For the sulphonation of the respective aromatic compounds of the formula

(V)

to such of formula (IV) resp. for the sulphonation of the corresponding starting materials—in the case where the compounds of formula (IV) are further reaction products of sulphonated starting materials—it is of advantage to use an excess of sulphuric acid, preferably of 5-25 mol % over the stoichiometric quantity, so that a clearly acidic medium is present for the further reaction with (C).

Among the mentioned metal cations those of the transition metals are preferred principally copper, nickel, cobalt and manganese and their mixtures with each other and/or with magnesium and/or zinc, in particular copper ions and their mixtures with one or more of the other metal ions, advantageously with magnesium, zinc or preferably nickel ions. The equivalents ratio of copper ions to the other metal ions in the mixture is advantageously in the range of 1:10 to 10:1, preferably 1:4 to 4:1, in particular 1:2 to 2:1. Particularly preferred is copper without any admixture of the other metals.

For the formation of the ammonium salts are suitable ammonia or amines, in particular, as they are conventionally employed for salt formation in anionic compounds. As amines come principally into consideration aliphatic amines, in particular mono-, di- or tri-($C_{1-4}$-alkyl)- or -($C_{2-3}$-alkanol)-amines or also heterocyclic- preferably monocyclic-amines, preferably mono-, di- or triethanolamine, mono-, di- or triisopropanolamine, N-methyl-N-ethanol amine or morpholine. With particular advantage there is, however, employed ammonia for salt formation.

The above defined products (S) may be produced by condensation of the components (A) and (B) with (C) under acidic conditions—for the formation of $CH_2$-bridges linked to aromatic nuclei—and reaction with a (D)-yielding compound or a mixture thereof and with ammonia and/or an amine. Per mole of aromatic sulphonic acid (A) there are employed advantageously 0.25 to 5 moles of dihydroxydiphenylsulphone (B) and 0.3-5 moles of formaldehyde or the corresponding amount of a formaldehyde-yielding compound (e.g. paraformaldehyde).

As (D)-yielding compounds are suitable any corresponding metal compounds as conventionally employed for the formation of metal complexes and/or metal salts of anionic compounds, preferably compounds of bivalent metals, principally oxides, hydroxides, carbonates, salts of mineral acids (preferably chlorides or sulphates) or of low molecular aliphatic carboxylic acids (e.g. acetates) and basic salts (e.g. basic carbonates). Suitable metal compounds are, in particular, copper oxide, chloride, sulphate and basic carbonate, nickel oxide, sulphate, hydroxide and basic carbonate, magnesium hydroxide, basic zinc carbonate, manganese sulphate or carbonate and cobalt sulphate, carbonate or basic carbonate. If desired, there may be also employed mixtures of metal compounds, e.g. copper oxide and nickel oxide or -hydroxide, copper sulphate and nickel sulphate, copper oxide and magnesium oxide or copper oxide and basic zinc carbonate.

The metal compounds for the introduction of the ions (D) may be added before and/or after the condensation with (C) and/or before and/or after the addition of ammonia and/or amine. The employed quantity of metal ion is advantageously in the range of 0.5-10% by weight, preferably 1-6% by weight, in particular about 3% by weight, referred to the condensation product of (C) with (A) and (B).

The condensation of the aromatic compounds (A) and (B) with (C) may be carried out according to a manner known per se, analogously as e.g. described in U.S. Pat. Nos. 1,901,536, 1,972,797 and 3,790,344, in Swiss Patents 252 302, 252 303, 243 516, 243 517, 283 401 and 239 762, in German Patents 611 671 and 744 824, in DE 19 61 369 A and in British Patent 615 190—which are incorporated herein by reference—, advantageously at temperatures in the range of 60°–110° C., preferably 80°–105° C.

The metallization reaction may be carried out under conditions conventional per se, in particular under temperature conditions similar to those for the condensation, advantageously at 60°–110° C., preferably 80°–105° C. The metal compounds and the sulphuric acid are advantageously employed in such amounts that the acid is also in excess over the employed quantity of metal compound. The use of the metal carbonates is, in particular under clearly acidic conditions, sometimes less advantageous because of the evolving of $CO_2$. Preferably (D) is reacted with (A) before the condensation of (A) and (B) with (C).

The so-produced condensation products are treated—preferably in the presence of water—with ammonia (in particular $NH_4OH$-solution) and/or amine as described above up to a pH-value of the aqueous product $\geq 7.8$, advantageously in the range of 8–10.5, in particular 8–10, and if desired diluted with water to a standard concentration. Convenient standard concentrations are in the range of 15–50, preferably 20–40% by weight of dry substance. If desired, e.g. in order to facilitate practical handling, organic solvents advantageously alcohols, preferably aliphatic $C_{2-8}$-alcohols (in particular ethanol, isopropanol or mono- or diethyleneglycol and its $C_{1-4}$-alkylmonoethers, e.g. butylglycol) may be added to the solutions.

The products (S) of the invention serve as assistants for the treatment of various textile and non-textile substrates (principally textile material, leather, paper and wood) in particular from aqueous medium. They are multifunctional: in particular in dyeing and optically brightening (mainly of synthetic polyamides and such containing mixed fabrics) with anionic optionally metalized dyes resp. anionic optical brighteners, they act as wet-fastness improvers (mainly improvement of fastnesses to sweat, water and washing). Applied even in small amounts they improve the light-fastness (in particular also under elevated temperature) of the dyes and of the fibres without impairing the properties of the dyes and of the substrates (in particular their tensile strength). They cause practically no shade alteration, the metal ions being fixed to a high degree in the substrates, thus practically not burdening the back-water. The improvement of the light-fastness—in particular also under exposure to light at elevated temperature, e.g. according to the so-called FAKRA-test)—plays a deciding role, principally in textiles for car-seats where long-lasting exposures to sunlight at high temperatures (e.g. up to 70° C. and above) may occur.

The treatment with the assistants (S) of the invention takes place advantageously from aqueous medium and may be carried out according to conventional treatment conditions, principally by exhaust procedures from short or long liquors (e.g. at a liquor-to-goods ratio in the range of 5:1 to 120:1, preferably 10:1 to 60:1, advantageously at temperatures in the range of 60°–120° C., if necessary under superatmospheric pressure, or by impregnation methods (e.g. padding, dipping, spraying, foam-application or printing) under conventional impregnation conditions (in particular at temperatures in the range of 15°–40° C.) and drying resp. fixation of the impregnated goods by cold or warm dwelling, steaming or thermosol heat-treatment. The pH of the treatment-liquor is advantageously in the range of 5–8.5, preferably 5.5–8. The treatment for the improvement of the fastnesses of a dyeing may be carried out before, simultaneously with or even after the dyeing.

The products (S) may also be employed with success in the tanning and dyeing of leather, in particular in order to diminish the damaging influence of sunlight. They may be applied before, during or after the dyeing or tanning. The products (S) are employed, in particular on textiles, advantageously in amounts of 0.01–3% by weight, referred to the weight of the substrate. Application, together with the dyeing liquor (or with the tanning agent), is preferred, the products building-up on the fibres and/or penetrating into these and fixation of the products taking place simultaneously with that of the dye or tanning agent.

When impregnating wood (against decomposition due to light and weather influence and as a fungicide) there are employed larger amounts of the products (S), in particular 1–5% by weight.

In the use on paper there may be achieved, in particular on paper for ink-jet printing, an improvement of the light-fastness.

On textile material and paper the products (S) may advantageously be also applied, together with optical brighteners and/or UV-absorbers and a further object of the invention is the combined application of the products (S) of the invention, together with UV-absorbers and compositions comprising both. Any conventional UV-absorbers, e.g. such as described in EP 255 481 A, mainly such of the benzophenone series, of the oxalic acid dianilide series, of the 2,2,6,6-tetraalkylpiperidine series or of the benzotriazol series, in particular as described in GB 1 234 128 A, GB 1 362 957 A, GB 1 474 281 A, GB 1 474 282 A, GB 2 000 512 A, GB 2 085 001 A, GB 2 091 732 A and CHP 496 060, all of which are incorporated herein by reference, may be employed. Of the mentioned UV-absorbers those of the 2-(2'-hydroxyphenyl)-benzo-v-triazole series-especially 2-(2'-hydroxyphenyl)-benzo-v-triazole that is substituted at the 2-positioned phenyl, besides the hydroxy group, optionally by one or two $C_{1-4}$-alkyl groups and at the benzo-ring optionally by one chlorine-in particular as described in GB 2 187 746 A, are preferred. The UV-absorbers may be employed in the form of conventional commercial aqueous compositions and may be admixed, e.g. by stirring at room temperature with the products (S) of the invention (optionally diluted, e.g. in the form of standard solutions, as described above). Advantageously there are employed 0.3–10, preferably 0.7–5 parts by weight of UV-absorber (calculated as dry substance) per part by weight of product (S) of the invention (calculated as dry substance). Particularly advantageous are mixtures of UV-absorber and (S) in the weight ratio of 30–80% by weight of UV-absorber to 70–20% by weight of (S), preferably 50–80% by weight of UV-absorber to 50–20% by weight of (S). By the addition of the UV-absorber there may be achieved excellent results, in particular in the light-fastness improvement even with minor amounts with the products (S) of the invention—in particular 0.002–1% by weight, referred to the weight of the substrate. The salts (S) of the invention and the UV-absorbers are conveniently formulated together into aqueous compositions. These compositions comprise salts (S) and UV-absorbers, together with water and any eventual by-products from their production and optionally additional solvent (as described above) and in particular consist essentially thereof. The total content of salts (S) according to the invention and UV-absorbers in these compositions is advantageously in the range of 15-50, preferably 20-40% by weight.

A further object of the invention are the compounds of formula (I) and/or (II), at least partially metallized with copper, cobalt, manganese, nickel, zinc and/or magnesium ions [in the following designated as products (W) or metallized compounds (W)] and preferably their ammonium salts [in the following designated as products ($S_1$) or salts ($S_1$)]. The metallization of the compounds of formulae (I) and (II) may take place as described above for component (A), preferably employing 300-600 mval of (D)-yielding metal compound (1 val metal compound = 1 mole metal compound divided by the valence of the metal ion) per val of sulphonic acid of formula (I) resp. (II) (1 val of sulphonic acid = 1 mole of sulphonic acid divided by the number of sulphonic acid groups in the molecule). For the production of salts ($S_1$) the metallized compounds (W) are advantageously treated with ammonia and/or amine, analogously as described above for (S), preferably up to a pH ≧ 7.8, in particular 8-10.5, most preferably 8-10. Also these products ($S_1$) may, if desired, be diluted to a standard concentration and/or optionally be combined with UV-absorbers, analogously as described above for (S). The products (W) and ($S_1$) serve as intermediates for the production of the above indicated products (S). The products ($S_1$) may, however, themselves, analogously as the above products (S), be also used as assistants in the treatment of various substrates and, in particular, as light-fastness improvers (even under light exposure conditions at elevated temperature) principally for polyamide-containing substrates, mainly textile material of synthetic polyamide. Optionally they may also be employed in combination with UV-absorbers, analogously as described above for the partially metallized ammonium salts (S). They may, in particular, also be employed as levelling agents and as dispersing agents in the dyeing of the mentioned substrates. Also these products ($S_1$) are distinguished by their good efficiency and by not impairing the properties of the substrate.

In the following examples parts an percentages are by weight, the temperatures are indicated in degrees Celsius: if not indicated otherwise ammonia is employed as a 27% solution; the pressure is indicated in torr (1 torr = 1.333 mbar).

EXAMPLE 1

106 parts of meta-xylene are heated to 50°-55° with good stirring and under a nitrogen blanket then treated with 147 parts of sulphuric acid (100%) allowing the temperature to raise to 80°-95°; then, the mixture is heated to 100°-105° and stirred for further two hours at this temperature. 18.6 parts of copper oxide are then added at 95°-100°, by which the temperature may raise to 105°-110°, and stirring is continued for further 30 minutes.

250 parts of dihydroxydiphenylsulphone are then added, by which the temperature falls to about 80°-85°, 121.6 parts of formaldehyde (37%) are then added dropwise with heating to 88°-93° and stirring is continued for one hour, by which the product becomes very viscous. 120 parts of demineralized water are added, then the mixture is cooled to 75°-80°, ammonia (about 400 parts 30%) is added under reflux and with cooling of the reaction mixture to achieve a pH of 9.4-9.6 and finally the product is diluted with about 205 parts of demineralized water to a concentration of 35% dry substance. The so-obtained product contains 1.0% $Cu^{2+}$.

As dihydroxydiphenylsulphone there may be employed pure 4,4'dihydroxydiphenylsulfone or the commercial mixture of 4,4'- and 2,4'-dihydroxydiphenylsulphone.

The following Table 1 contains further products (S) which are obtainable analogously as described in Example 1 as $NH_4^+$ salts, and are characterized by the starting materials and the content of metal and dry substance.

TABLE 1

| Ex. No. | Compound of Formula (V) (1 Mole) | $H_2SO_4$ Moles | Dihydroxy- diphenylsulphone Moles | Formal- dehyde Moles | Final product | | employed → as |
|---|---|---|---|---|---|---|---|
| | | | | | % dry substance | % Metal | |
| 2 | meta-Xylene | 1.5 | 1.36 | 1.75 | 28.9 | 0.8 | $CuSO_4.5H_2O$ |
| 3 | " | 1.5 | 1.36 | 1.75 | 32.7 | 1.0 | CuO |
| 4 | " | 1.5 | 1.36 | 1.75 | 28.3 | 1.7 | CuO |
| 5 | " | 1.5 | 1.36 | 1.75 | 34.5 | 2.0 | CuO |
| 6 | " | 1.5 | 1.36 | 1.75 | 34.2 | 0.5 | CuO |
| 7 | " | 1.5 | 1.36 | 1.75 | 34.3 | 0.5 | $CuSO_4.5H_2O$ |
| 8 | " | 1.5 | 1.36 | 1.75 | 35.0 | 0.2 | CuO |
| 9 | " | 1.5 | 1.36 | 1.75 | 35.1 | 1.0 | $CuSO_4.5H_2O$ |
| 10 | " | 1.5 | 1.0 | 1.5 | 34.4 | 2.0 | CuO |
| 11 | " | 1.5 | 1.0 | 1.5 | 34.5 | 0.75 | CuO |
| 12 | " | 1.5 | 1.0 | 1.5 | 34.2 | 0.6 | CuO |
| 13 | Ditolylether | 1.5 | 1.0 | 1.2 | 33.7 | 1.0 | CuO |
| 14 | " | 1.5 | 1.0 | 1.2 | 33.1 | 0.5 | CuO |
| 15 | " | 1.5 | 1.36 | 1.75 | 33.4 | 0.5 | CuO |
| 16 | " | 1.5 | 1.36 | 1.75 | 33.0 | 1.0 | CuO |
| 17 | " | 1.5 | 1.6 | 2.0 | 33.0 | 1.0 | CuO |
| 18 | " | 1.25 | 1.6 | 2.0 | 33.0 | 1.0 | CuO |
| 19 | " | 1.5 | 2.4 | 2.5 | 32.1 | 1.0 | CuO |
| 20 | " | 1.5 | 4.0 | 4.1 | 31.1 | 1.0 | CuO |
| 21 | Diphenyl- ether | 1.23 | 2.0 | 2.1 | 31.8 | 1.0 | CuO |
| 22 | " | 1.23 | 4.0 | 4.1 | 30.5 | 1.0 | CuO |
| 23 | m-Xylene | 1.5 | 1.0 | 1.5 | 35.8 | 1.0 | $CuCl_2.2H_2O$ |
| 24 | " | 1.5 | 1.0 | 1.5 | 34.5 | 1.0 | CuO |

TABLE 1-continued

| Ex. No. | Compound of Formula (V) (1 Mole) | $H_2SO_4$ Moles | Dihydroxy-diphenylsulphone Moles | Formaldehyde Moles | Final product % dry substance | % Metal | employed as |
|---|---|---|---|---|---|---|---|
| 25 | " | 1.5 | 1.0 | 1.5 | 35.3 | 1.0 | $CuSO_4.5H_2O$ |
| 26 | " | 1.5 | 1.0 | 1.5 | 36.0 | 1.0 | $CuCl_2.2H_2O$ |
| 27 | " | 1.5 | 1.0 | 1.5 | 34.3 | 1.0 | $CuCO_3.Cu(OH)_2$ |
| 28 | " | 1.5 | 1.0 | 1.5 | 34.8 | 1.0 | $CuCl_2.2H_2O$ |
| 29 | " | 1.5 | 1.0 | 1.2 | 35.4 | 1.0 | $CuCl_2.2H_2O$ |
| 30 | Naphthalene | 1.5 | 1.0 | 1.2 | 34.0 | 1.0 | CuO |
| 31 | Tetrahydronaphthalene | 1.1 | 0.28 | 0.37 | 35.2 | 1.0 | CuO |
| 32 | meta-Xylene | 1.5 | 1.0 | 1.5 | 32.0 | 1.0 | NiO |
| 33 | " | 1.5 | 1.0 | 1.5 | 33.6 | 1.0 | $CoSO_4.7H_2O$ |
| 34 | " | 1.5 | 1.0 | 1.5 | 34.5 | 1.0 | $MnSO_4.7H_2O$ |
| 35 | " | 1.5 | 1.0 | 1.5 | 35.0 | 0.5 / 0.5 | NiO / CuO |
| 36 | " | 1.5 | 1.0 | 1.5 | 35.5 | 1.0 | $NiSO_4.6H_2O$ |
| 37 | " | 1.5 | 1.0 | 1.5 | 36.7 | 1.0 | $MnSO_4.7H_2O$ |
| 38 | " | 1.5 | 1.0 | 1.5 | 37.4 | 1.0 | $CoSO_4.7H_2O$ |
| 39 | Biphenyl | 1.75 | 1.0 | 1.0 | 37.2 | 1.0 | CuO |
| 40 | o-Phenylphenol | 2.17 | 0.85 | 1.19 | 37.5 | 1.0 | CuO |
| 41 | Biphenyl | 1.97 | 0.92 | 0.92 | 35.8 | 1.0 | CuO |
| 42 | meta-Xylene | 1.5 | 1.0 | 1.5 | 36.7 | 1.0 | $(ZnCO_3)_2[Zn(OH)_2]_3$ |
| 43 | " | 1.5 | 1.0 | 1.5 | 35.9 | 0.5 | $Mg(OH)_2$ |
| 44 | Anisol | 1.5 | 0.8 | 1.0 | 36.7 | 1.0 | CuO |
| 45 | Dihydroxydiphenylsulphone | 2.17 | 0.25 | 1.19 | 35.8 | 1.0 | CuO |
| 46 | meta-Xylene | 1.5 | 1.0 | 1.5 | 35.9 | 0.5 / 0.5 | CuO / $Mg(OH)_2$ |
| 47 | " | 1.5 | 1.0 | 1.5 | 36.7 | 0.5 / 0.5 | CuO / $(ZnCO_3)_2[Zn(OH)_2]_3$ |

EXAMPLE 48

The procedure of Example 5 is repeated with the difference that instead of dihydroxydiphenylsulphone there is employed the same quantity of 3,3'-dimethyl-4,4-dihydroxydiphenylsulphone.

EXAMPLE 49

A) 792 parts of ditolylether (technical mixture) are slowly treated during 30-45 minutes under a nitrogen blanket, with cooling and with thorough stirring, with 588 parts of sulphuric acid monohydrate. After completion of the addition the temperature has reached 100° to 105° and the reaction is allowed to complete during further 5½-6 hours at this temperature under a nitrogen blanket. At a vacuum of 10-15 torr the temperature of the reaction mixture is increased during 10-20 minutes to 120°. After 20-30 minutes the water formed in the reaction is practically completely eliminated from the sulphonation mixture. The vacuum is then reduced to 3-6 torr and the reaction mixture is heated during 15 minutes to a temperature between 160° and 180° and maintained at this temperature for about 6 hours until the obtained acidic resin has an acid content of 330-390 mval/100 g.

B) 1 val of the so-obtained compound is treated, analogously as described in Example 1, with CuO, then condensed with 0.5 moles of dihydroxydiphenylsulphone and 1 mole of formaldehyde; the obtained mixture is then treated with ammonia (30%) and ethanolamine in the weight ratio of 1:1 up to a pH of 9.5 and is then diluted with demineralized water to a dry substance concentration of 35.0%. The amount of CuO is such that in the obtained final (diluted) product the copper content is 3%.

EXAMPLE 50

The procedure of Example 49 is repeated, with the difference that instead of 0.5 moles of dihydroxydiphenylsulphone there is employed 1 mole of didhydroxydiphenylsulphone.

EXAMPLE 51

1190 parts of an acidic resin of 355 mval acid per 100 g, obtained according to the procedure described in Example 49 A) are slightly cooled and treated with 1800 parts of water and then at 40° with 115 parts of $CuCO_3.Cu(OH)_2$; the obtained mixture is treated with concentrated ammonia solution up to a pH of 8 and then diluted with water to a dry substance content of 30%.

If desired, the pure (dry) product may be obtained by evaporation of the obtained aqueous product. When re-dissolving the dry product it may be necessary—in order to obtain a stable solution of pH 8—to add a small amount of ammonia or another nitrogen base.

The following Table 2 contains further products (W) resp. ($S_1$) that are obtainable analogously as described in Example 51 and which are characterized by the content of sulphonic acid groups and the employed metal compound (kind and % referred to the acidic resin).

TABLE 2

| Ex. Nr. | mval acid per 100 g | employed metal compound kind | % |
|---|---|---|---|
| 52 | 355 | $CuCO_3.Cu(OH)_2$ | 19.6 |
| 53 | 388 | CuO | 2.0 |
| 54 | 355 | " | 3.5 |
| 55 | 350 | " | 5.2 |
| 56 | 376 | " | 7.5 |
| 57 | 380 | $NiCO_3.2Ni(OH)_2.4H_2O$ | 12.0 |
| 58 | 380 | $MnCO_3$ | 12.0 |
| 59 | 375 | CuO | 27.0 |
| 60 | 375 | NiO | 7.0 |
| 61 | 375 | $Mg(OH)_2$ | 2.8 |

TABLE 2-continued

| Ex. Nr. | mval acid per 100 g | employed metal compound kind | % |
|---|---|---|---|
| 62 | 375 | CoCO$_3$.[Co(OH)$_2$]$_2$.aq. | 12.0* |
| 63 | 375 | (ZnCO$_3$)$_2$.[Zn(OH)$_2$]$_3$ | 5.5 |
| 64 | 375 | Ni(OH)$_2$ | 4.6 |
| 65 | 375 | CuSO$_4$.5H$_2$O | 20.9 |
| 66 | 375 | CuO. NiO | CuO 2.0 NiO 7.0 |

*The basic cobalt carbonate contains 46.5% Co.

EXAMPLES 67 AND 68

The compounds of the Examples 67 and 68 are synthesized analogously as described in Example 51 with the difference that in place of the ditolylether there is employed diphenylether in the molar ratio to the sulphuric acid monohydrate of 1:1.5. The acidic resin is of 389 mval acid per 100 g and is reacted either with 2.0 g of CuO per 100 g of resin (=Example 67) or with 7.6 g of CuO per 100 g of resin (=Example 68).

EXAMPLE 69

The procedure described in Example 51 is repeated, with the difference that a mixture of 0.75 moles of phenol and 0.25 moles of diphenylether is reacted with 1.5 moles of sulphuric acid monohydrate (100 g of the obtained resin=477 mval acid) and 100 parts of the resin are treated with 4.7 parts of CuO.

EXAMPLE 70

The procedure described in Example 51 is repeated, with the difference that 0.5 moles of diphenylether and 0.5 moles of dihydroxydiphenylsulphone are reacted with 1.5 moles of sulphuric acid and the obtained product is treated with copper oxide in the ratio of 3.7 g of CuO per 100 g of resin.

EXAMPLES 71 AND 72

The procedure described in Example 51 is repeated, with the difference that the coppered product is treated with monoethanolamine (Example 71) or morpholine (Example 72) up to a pH of 8 in place of ammonia.

EXAMPLE 73

The procedure according to Example 59 is repeated, with the difference that in place of ammonia solution there is used diethanolamine for setting the pH to 8.

EXAMPLE 74

The resin [compound of formula (I)] produced according to Example 2 of Swiss Patent 470 367 from 184 parts of 3-hydroxy-diphenyleneoxide and 147 parts of sulphuric acid (100%) is treated in form of the concentrated aqueous solution with 5.2% CuO and then set with ammonia solution to a pH of 8.

EXAMPLE 75

The resin obtained according to Example 3 of Swiss Patent 470 367 from 170 parts of diphenyloxide and 147 parts of sulphuric acid (100%) is treated in concentrated aqueous solution with 3.5% of CuO and set with ammonia solution to a pH of 8.

EXAMPLE 76

100 parts of the product named "phenylsulphone N" according to Swiss Patent 473 274 (column 7, third paragraph) are treated analogously as described in Example 51 with 3.5 parts of CuO and then set with ammonia to a pH of 8.

The products obtained as described in the above Examples 1-76 may be employed as such in the form of their aqueous compositions or may be dried (e.g. by spray-drying or evaporating as indicated in Example 51).

Composition I 50 parts of the aqueous product of Example 1 are admixed with stirring at room temperature (=20°) with 50 parts of a 25% aqueous dispersion of the UV-absorber of the formula

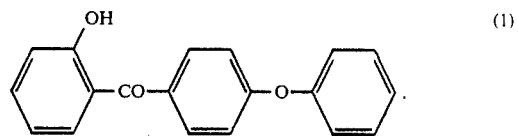

Composition II 50 parts of the aqueous product of Example 1 are admixed with stirring at room temperature with 50 parts of a 30% aqueous dispersion of the UV-absorber of formula

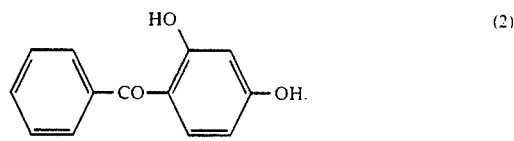

Composition III 50 parts of the aqueous product of Example 1 are admixed with stirring at room temperature with 50 parts of a 30% aqueous dispersion of the UV-absorber of formula

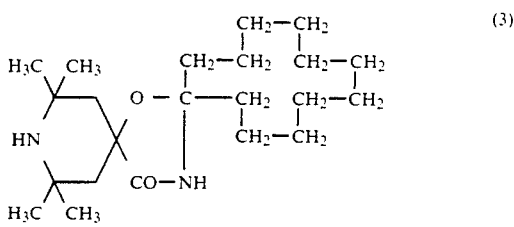

Composition IV 30 parts of the aqueous product of Example 1 are admixed with stirring at room temperature with 70 parts of a 25% aqueous dispersion of the UV-absorber of the formula

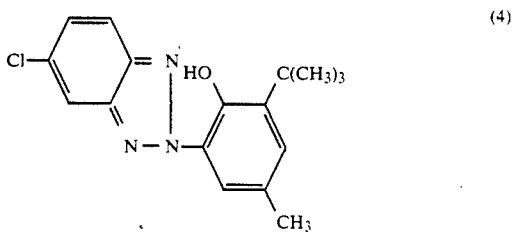

composition V 50 parts of the aqueous product of Example 1 are admixed with stirring at room temperature with 50 parts of a 25% aqueous dispersion of a mixture of the UV-absorbers of the formulae (III) and (IV) in even parts.

Composition VI 30 parts of the aqueous product of Example 1 are admixed with stirring at room temperature with 70 parts of a 30% aqueous dispersion of the UV-absorber of the formula

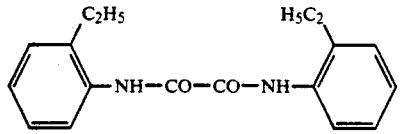

Analogously as the product of Example 1 the products of the Examples 2-76 are admixed as in the compositions I-VI with the there employed UV-absorbers to corresponding compositions.

APPLICATION EXAMPLE 1

A) A nylon-6-fabric is dyed by the exhaust method at a liquor-to-goods ratio of 20:1 in an aqueous liquor containing 0.3% of the dye C.I. Acid Blue 280 (commercial product), 2% of ammonium sulphate and either 0.5% or 1.0% of the aqueous product of Example 1 and the pH of which is set to 6 with acetic acid, for 1 hour at 98°, then rinsed with water and dried. The obtained dyeings display a notably higher light fastness then a corresponding dyeing obtained, however, without the product of Example 1.

B) The procedure of Application Example 1A) is repeated with the difference that in place of the product of Example 1 there are employed the products of Examples 4, 5 and 6 resp. The obtained dyeings show also a notably higher light-fastness than a corresponding dyeing obtained without the respective products of the invention.

APPLICATION EXAMPLE 2

Analogously as described in Application Example 1 the assistant according to Example 1 is employed in the dyeing of a Nylon 66 fabric with a dye-mixture of 0.01% C.I. Acid Yellow 235, 0.006% C.I. Acid Red 217 and 0.046% C.I. Acid Black 218. In this case the improvement of the light fastness over a dyeing obtained in the same way that without the assistant of the invention is still higher than in Application Example 1. In an analogous way there are employed the assistants of Examples 14 and 21 instead of that of Example 1.

APPLICATION EXAMPLE 3

The procedure described in Application Example 1 is repeated, with the difference that instead of 0.3% of C.I. Acid Blue 280 there are employed 0.5% of C.I. Acid Black 58. The obtained dyeings are distinguished by a better light fastness than the one of the corresponding dyeing obtained without the assistant.

APPLICATION EXAMPLE 4 (DRUM-DYEING)

The percentages refer to the dry weight of the leather.

Two pieces of intermediately dried split chrome-leather are wetted back with 200% of water and 0.3% of ammonia and one of the two pieces is dyed with the following dyeing liquor according to A:

A.
400.0% of water at 50°
1.0% of C.I. Acid Brown 338 and
2.0% of the assistant according to Example 1 in the form of dry powder (100%).

Drumming is continued for 60 minutes then 5.0% of a commercial fat-liquor (SANDOLIX WWL) are added, after further 30 minutes of drumming the pH of the liquor is set to 3.5 by addition of formic acid and after further 20 minutes of drumming the leather is rinsed, discharged, drained, set-out, dried, fluffed and de-dusted.

The other piece of leather is dyed according to B:

B. The dyeing process described under A. is repeated, however without the assistant according to Example 1.

The light-fastness of dyeing A. is clearly higher than the one of dyeing B.

APPLICATION EXAMPLE 5

A) A nylon-6-fabric is dyed by the exhaust method at a liquor-to-goods ratio of 20:1 in an aqueous liquor containing 0.3% of the dye C.I. Acid Blue 280 (commercial product), 2% of ammonium sulphate and either 0.5% or 1.0% of the aqueous product of Example 51 and the pH of which is set to 6 with acidic acid for 1 hour at 98°, then rinsed with water and dryed. The obtained excellently level dyeings display a notably higher light fastness than a corresponding dyeing obtained, however, without the product of Example 51.

B) The procedure of Application Example 1A) is repeated, with the difference that in place of the product of Example 1 there are employed the products of Examples 54, 55 and 56 resp.. The obtained excellently level dyeings show also a notably higher lightfastness then a corresponding dyeing obtained without the respective products of the invention.

APPLICATION EXAMPLE 6

Analogously as described in Application Example 5 the assistant according to Example 51 is employed in the dyeing of a Nylon 66 fabric with a dye-mixture of 0.01% C.I. Acid Yellow 235, 0.006% C.I. Acid Red 217 and 0.046% C.I. Acid Black 218. In this case the improvement of the light fastness over a dyeing obtained in the same way that without the assistant of the invention ist still higher than in Application Example 1. In an analogous way there are employed the assistants of Examples 54, 55 and 56 instead of that of Example 51.

APPLICATION EXAMPLE 7

The procedure described in Application Example 5 is repeated, with the difference that instead of 0.3% of C.I. Acid Blue 280 there are employed 0.5% of C.I. Acid Black 58. The obtained dyeings are distinguished by a better light fastness than the one of the corresponding dyeing obtained without the assistant.

APPLICATION EXAMPLE 8 (DRUM-DYEING)

The percentages refer to the dry weight of the leather.

Two pieces of intermediately dried split chrome-leather are wetted back with 200% of water and 0.3% of ammonia and one of the two pieces is dyed with the following dyeing liquor according to A:

A.
400.0% of water at 50%
1.0% of C.I. Acid Brown 338 and
2.0% of the assistant according to Example 56 in the form of dry powder (100%)

Drumming is continued for 60 minutes then 5.0% of a commercial fat-liquor (SANDOLIX WWL) are added, after further 30 minutes of drumming the pH of the liquor is set to 3.5 by addition of formic acid and after further 20 minutes of drumming the leather is rinsed, discharged, drained, set-out, dried, fluffed and de-dusted.

The other piece of leather is dyed according to B:

B. The dyeing process described under A. is repeated, however without the assistant according to Example 56.

The light fastness of dyeing A. is clearly higher than the one of dyeing B.

According to the above eight Application Examples there are employed also the products of the remaining Examples.

APPLICATION EXAMPLE 9

The process of Application Example 1 is repeated, with the difference that in place of the product of Example 1 there is employed the same amount of Composition I. The obtained dyeing is distinguished by its high light-fastness (even under elevated temperature).

APPLICATION EXAMPLE 10

The procedure described in Application Example 2 is repeated, with the difference that in place of the product of Example 1 there is employed the same amount of Composition I. The obtained dyeing is distinguished by its high light-fastness (even under elevated temperature).

APPLICATION EXAMPLE 11

The procedure of Application Example 3 is repeated, with the difference that instead of the product of Example 1 there is employed the same amount of Composition I. The obtained dyeing is distinguished by its high light-fastness (even under elevated temperature).

In the same way as Composition I the Compositions II, III, IV, V and VI are employed in the above Application Examples 9, 10 and 11.

I claim:

1. A composition comprising at least one UV-absorber and a partially metallized ammonium salt of a sulpho group-containing product of condensing
   A) at least one sulpho group-containing aromatic compound and
   B) at least one dihydroxydiphenylsulphone with
   C) formaldehyde or a formaldehyde-yielding compound, which is partially metallized with
   D) manganese, cobalt, nickel, zinc, magnesium or copper ions or a mixture thereof,
   or a mixture of such salts.

2. A composition according to claim 1, wherein (A) is a sulphonation product of xylene, anisol, diphenylether, ditolylether, naphthalene, tetrahydronaphthalene, biphenyl, diphenylene oxide, ortho-phenylphenol, di-(phenylether)-sulphone, poly-(phenylethersulphone), unsubstituted dihydroxydiphenylsulphones or methyl-substituted dihydroxy-diphenylsulphones or a mixture thereof.

3. A composition according to claim 1, wherein (A) is an aromatic mono- or oligosulphone of the formula

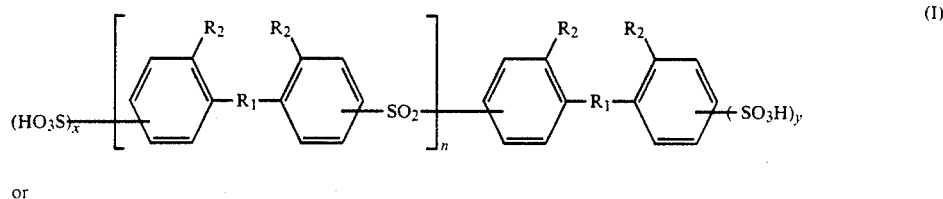

or

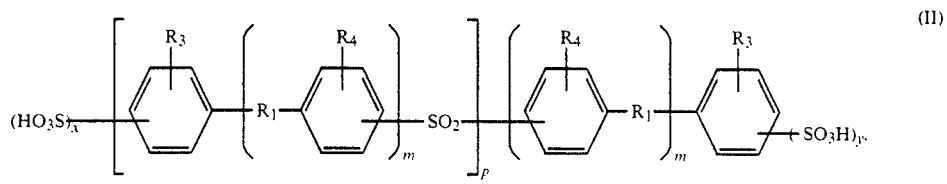

wherein
the symbols $R_1$ signify independently from each other —O— or —S—,
the symbols $R_2$ signify independently from each other hydrogen or two Symbols $R_2$ on phenylene rings which are separated by $R_1$ form together a direct bond;
the symbols $R_3$ signify, independently from each other, hydrogen or methyl if m in the neighbouring group not separated by $SO_2$ signifies 1, or hydroxyl if m in the neighbouring groups signifies 0;
the symbols $R_4$ signify independently from each other hydrogen or methyl,
the symbols m signify 0 or 1, the sum of all m's being at least 1,
n signifies a number from 1–7,
p signifies a number from 3–7,
and x and y signify, independently from each other, 0 or 1,
provided that at least one of x and y signifies 1, the benzene rings in formula (I) are either further unsubstituted or bear a further substituent, selected from the group consisting of hydroxyl, $C_{1-4}$-alkyl and $C_{1-4}$-alkoxy and in formula (II) at least 25% of the symbols m signify 1,
or mixtures thereof.

4. A composition according to claim 3 wherein, in formulae (I) and (II), each $R_1$ is oxygen, each $R_2$ is hydrogen, $R_3$ is methyl when m in the neighboring group not separated by $SO_2$ signifies 1, each $R_4$ is methyl and the benzene rings in formula (I) are further unsubstituted.

5. A composition according to claim 3 wherein the quantity of metal ion (D) is in the range 0.5%–10% by weight of the condensation product of (C) with (A) and (B).

6. A composition according to claim 1 wherein (A) is a mono- or polycyclic aromatic sulphonic acid selected from the group consisting of sulphonation products of xylene, anisole, diphenylether, ditolylether, naphthalene, tetrahydronaphthalene, biphenyl, diphenylene oxide, ortho-phenylphenol, di(phenylether)-sulphone, poly-(phenylether) sulphone, unsubstituted dihydroxydiphenylsulphones and methyl-substituted dihydroxydiphenylsulfones, and sulpho group-containing condensates from the condensation of sulphonation products of phenol, diphenyl ether, diphenyl thioether, diphenylene oxide or diphenylene sulphide, which sulphonation products may be further substituted by $C_{1-4}$ alkyl and/or $C_{1-4}$ alkoxy and/or hydroxy.

7. A composition according to claim 6 wherein (B) is a compound of formula III

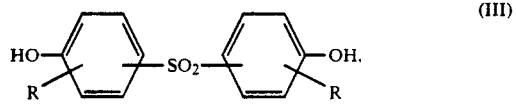

(III)

wherein each R, independently is hydrogen or methyl.

8. A composition according to claim 7, wherein (B) is 4,4'-, 2,4'-or 2,2'-dihydroxydiphenylsulphone or 3,3'-dimethyl-4,4'-dihydroxydiphenylsulphone or a technical mixture of such compounds or technical dicresyl sulphone.

9. A composition according to claim 8 wherein compound (A) contains, on average, 1-2 sulpho group when it is a monocycloaromatic compound and 1-3 sulpho groups when it is a polycycloaromatic compound.

10. A composition according to claim 1 wherein the UV-absorber is selected from the group consisting of benzophenones, oxalic acid dianilides, 2,2,6,6-tetraalkylpiperidines and benzotriazoles.

11. A composition according to claim 1 wherein the quantity of metal ion (D) is in the range 0.5-10% by weight of the condensation product of (C) with (A) and (B).

12. A composition according to claim 11 wherein the quantity of metal ion (D) is in the range 1-6% by weight of the condensation product of (C) with (A) and (B).

13. A salt which is an ammonium and metal complex salt of a polyaromatic sulphone that contains one or more repeating units of the formula

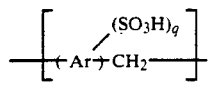

(a)

and of the formula

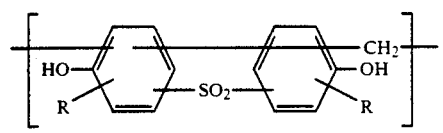

(b)

wherein the symbols
R signify independently from each other hydrogen or methyl
Ar signifies the radical of an aromatic compound
q signifies at least 1 and
metal signifies copper, nickel, manganese, cobalt, or a mixture thereof or a mixture of one or more of said metals with magnesium, zinc or a mixture of magnesium and zinc
or a mixture of such salts.

14. A metal-containing ammonium salt or mixture according to claim 13 in admixture with a metal-free ammonium salt of the polyaromatic sulphone that contains one or more repeating units of the formula (a) and of the formula (b) defined as in claim 2 or with a mixture thereof.

15. A salt or mixture of salts according to claim 13 wherein metal signifies copper, nickel, cobalt or a mixture thereof.

16. A salt or mixture thereof according to claim 15, wherein ammonium is unsubstituted ammonium.

17. A salt according to claim 13 wherein Ar is the radical of xylene, anisole, diphenylether, ditolylether, naphthalene, tetrahydronaphthalene, biphenyl, diphenylene oxide, orthophenylphenol, di-(phenylether)-sulphone, poly-(phenylether)sulphone, an unsubstituted dihydroxydiphenylsulphone, a methyl-substituted dihydroxydiphenylsulfone, or a condensate from the condensation of a sulphonation product of phenol, diphenylether, diphenylthioether, diphenylene oxide or diphenylene sulphide, which sulphonation product may be substituted by $C_{1-4}$-alkyl and/or -alkoxy and/or hydroxy.

18. A salt according to claim 17 wherein q has an average value in the range 1-2 when Ar is the radical of a monocycloaromatic compound and an average value in the range 1-3 when Ar is the radical of a polycycloaromatic compound.

19. A salt according to claim 18 wherein the unit of formula (b) is derived from 4,4'-, 2,4'- or 2,2'-dihydroxydiphenylsulphone or 3,3'-dimethyl-4,4'-dihydroxydiphenylsulphone or a technical mixture thereof or technical dicresyl sulphone.

20. A composition comprising at least one UV-absorber and an ammonium salt of a compound produced by at least partially metallizing, with copper, cobalt, manganese, nickel, zinc or magnesium ions or a mixture thereof, a compound of formula (I) or (II)

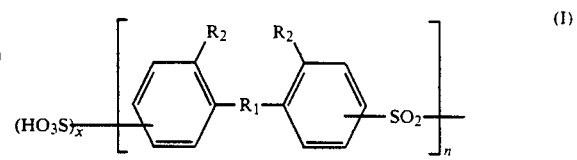

(I)

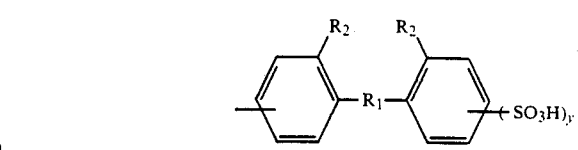

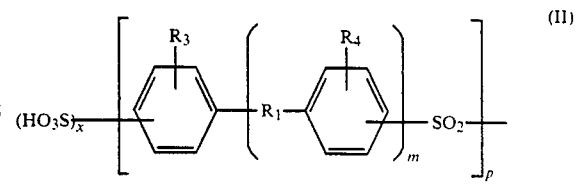

(II)

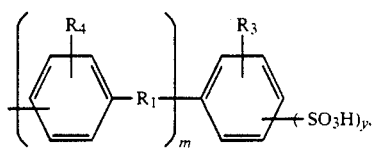

wherein
- each $R_1$, independently, is —O— or —S—
- each $R_2$, independently, is hydrogen or two $R_2$'s on phenylene rings which are separated by $R_1$ form together a direct bond,
- each $R_3$, independently, is hydrogen or methyl if m in the neighboring group not separated by $SO_2$ signifies 1, or hydroxyl if m in the neighboring groups signifies 0,
- each $R_4$, independently, is hydrogen or methyl,
- each m is 0 or 1, the sum of all m's being at least 1,
- n is a number from 1–7,
- p is a number from 3–7,
- and x and y are, independently from each other, 0 or 1, provided that at least one of x and y is 1, the benzene rings in formula (I) are either further unsubstituted or bear a further substituent selected from the group consisting of hydroxyl, $C_{1-4}$-alkyl and $C_{1-4}$-alkoxy and in formula (II) at least 25% of the symbols m are 1, or a mixture thereof.

21. A composition according to claim 20 wherein the UV-absorber is selected from the group consisting of benzophenones, oxalic acid dianilides, 2,2,6,6-tetraalkylpiperidines and benzotriazoles.

22. A process for producing a partially metalized ammonium salt of a sulpho group-containing condensation product which comprises I. condensing (A) at least one sulpho group-containing aromatic compound and (B) at least one dihydroxydiphenylsulphone with (C) formaldehyde or a formaldehyde-yielding compound under acidic conditions, reacting the resulting condensation product with a compound which yields (D) manganese, cobalt, nickel, zinc, magnesium and/or copper ions or a mixture thereof and then reacting the resulting (D)-containing condensation product with ammonia and/or an amine in the presence of water to a $pH \geq 7.8$, or II. condensing (A) and (B) with (C) under acidic conditions, reacting the resulting condensation product with ammonia and/or an amine in the presence of water to a $pH \geq 7.8$ and then reacting the resulting ammonium salt with a (D)-yielding compound, or III. reacting (A) with (D)-yielding compound, condensing the resulting product with (B) and (C) under acidic conditions and then reacting the resulting (D)-containing condensation product with ammonia and/or an amine in the presence of water to a $pH \geq 7.8$.

23. A process according to claim 22, wherein the reaction with the (D)-yielding compound is carried out before the condensation with (C).

24. A process according to claim 23 wherein
A) is a product of sulphonating meta-xylene,
B) is 4,4'-dihydroxydiphenylsulphone or a mixture of 4,4'- and 2,4'-dihydroxydiphenylsulphones,
C) is formaldehyde
D) the yielding compound is copper oxide and the source of the ammonium ion is ammonia.

25. A product of the process of claim 24.

26. A process according to claim 23 wherein
A) is a product of sulphonating ditolylether,
B) is 4,4'-dihydroxydiphenylsulphone or a mixture of 4,4'- and 2,4'-dihydroxydiphenylsulphones,
C) is formaldehyde
D) the yielding compound is copper oxide and the source of ammonium is a mixture of ammonia and ethanolamine.

27. A product of the process of claim 26.

28. A process according to claim 22 wherein (A) is a compound of formula IV $$H_2Ar—(SO_3H)_q \qquad (IV)$$

wherein Ar is the radical of xylene, anisole, diphenylether, ditolylether, naphthalene, tetrahydronaphthalene, biphenyl, diphenylene oxide, ortho-phenylphenol, di-(phenylether)-sulphone, poly-(phenylether)sulphone, an unsubstituted dihydroxydiphenylsulphone, a methyl-substituted dihydroxydiphenylsulfone, or a condensate from the condensation of a sulphonation product of phenol, diphenylether, diphenyl thioether, diphenylene oxide or diphenylene sulphide, which sulphonation product may be substituted by $C_{1-4}$-alkyl and/or -alkoxy and/or hydroxy; and q is at least 1; and (B) is a compound of formula III

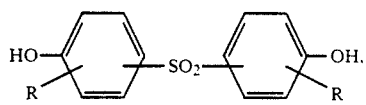 (III)

wherein the symbols R signify, independently from each other, hydrogen or methyl.

29. A process according to claim 22 wherein the (D)-yielding compound is employed in an amount effective to provide 0.5–10% (D) by weight of the condensation product of (C) with (A) and (B).

30. A process according to claim 29 wherein the (D)-yielding compound is employed in an amount effective to provide 1–6% (D) by weight of the condensation product of (C) with (A) and (B).

31. A process according to claim 30 wherein the reaction with ammonia and/or an amine is carried out in the presence of water to a pH in the range 8–10.5.

32. A partially metalized ammonium salt of a sulpho group-containing product of condensing
(A) at least one mono- or polycyclic aromatic sulphonic acid selected from the group consisting of sulphonation products of xylene, anisole, diphenylether, ditolylether, naphthalene, tetrahydronaphthalene, biphenyl, diphenylene oxide, orthophenylphenol, di-(phenylether)-sulphone, poly-(phenylether) sulphone, unsubstituted dihydroxydiphenylsulphones and methyl-substituted dihydroxydiphenylsulfones, and sulpho group-containing condensates from the condensation of sulphonation products of phenol, diphenyl ether, diphenyl thioether, diphenylene oxide or diphenylene suphide, which sulphonation products may be further substituted by $C_{1-4}$alkyl and/or $C_{1-4}$alkoxy and/or hydroxy and
(B) at least one dihydroxydiphenylsulphone of formula III

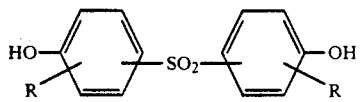

(III)

wherein each R, independently is hydrogen or methyl with (C) formaldehyde or a formaldehyde-yielding compound which is partially metalized with
(D) copper, nickel, cobalt or manganese or a mixture of such metals with each other or a mixture of one or more such metals with magnesium, zinc or a mixture of magnesium and zinc.

33. A salt according to claim 32 which is partially metallized with copper or with a mixture of copper with one or more of magnesium, zinc and nickel.

34. A salt according to claim 33 metallized with copper as the sole metal.

35. A salt according to claim 33 wherein the ammonium moiety is one which has been formed by reaction with ammonia, mono-, di- or triethanolamine, mono-, di- or triisopropanolamine, N-methyl-N-ethanolamine or morpholine.

36. A salt according to claim 35 wherein the reaction with ammonia or the amine is carried out in the presence of water to a pH in the range 8-10.5.

37. A salt according to claim 34 wherein the ammonium moiety is one which has been formed by reaction with ammonia.

38. A salt according to claim 37 wherein the reaction with ammonia is carried out in the presence of water to a pH $\geq$ 7.8.

39. A salt according to claim 38 wherein the reaction with ammonia is carried out in the presence of water to a pH in the range 8-10.5.

40. A salt according to claim 32 wherein the ammonium moiety is one which has been formed by reaction with ammonia, a mono-, di- or tri-($C_{1-4}$ alkyl)amine, a mono-, di- or tri-($C_{2-3}$-alkanol)amine or a monocyclic heterocyclic amine.

41. A salt according to claim 40 wherein compound (A) contains, on average, 1-2 sulpho group when it is a monocycloaromatic compound and 1-3 sulpho groups when it is a polycycloaromatic compound.

42. A salt according to claim 40 wherein the reaction with ammonia or the amine is carried out in the presence of water to a pH $\geq$ 7.8.

43. A salt according to claim 32 wherein the quantity of metal ion (D) is in the range 1-6% by weight of the condensation product of (C) with (A) and (B).

44. A process for producing an ammonium salt of a compound which is at least partially metalized with copper, cobalt, manganese, nickel, zinc or magnesium ions or a mixture thereof, which comprises either at least partially metalizing a compound of formula (I) or (II) by reacting it with a copper-, cobalt-, manganese-, nickel-, zinc- or magnesium-yielding compound or a mixture thereof and then reacting the resulting product with ammonia or an amine in the presence of water to a pH in the range 8-10.5 or reacting a compound of formula (I) or (II) with ammonia or an amine in the presence of water to a pH in the range 8-10.5 and then at least partially metalizing the resulting product by reacting it with a copper-, cobalt-, manganese-, nickel-, zinc- or magnesium-yielding compound or mixture thereof, said compound of formula (I) or (II) being of the formula

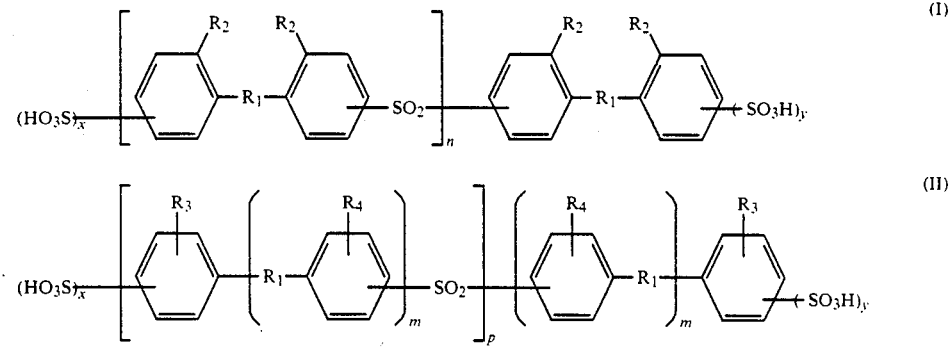

wherein
each $R_1$, independently, is —O— or —S—
each $R_2$, independently, is hydrogen or two $R_2$'s on phenylene rings which are separated by $R_1$ form together a direct bond,
each $R_3$, independently, is hydrogen or methyl if m in the neighboring group not separated by $SO_2$ signifies 1, or hydroxyl if m in the neighboring groups signifies 0,
each $R_4$, independently, is hydrogen or methyl,
each m is 0 or 1, the sum of all m's being at least 1,
n is a number from 1-7,
p is a number from 3-7,
and x and y are, independently from each other, 0 or 1, provided that at least one of x and y is 1, the benzene rings in formula (I) are either further unsubstituted or bear a further substituent selected from the group consisting of hydroxyl, $C_{1-4}$-alkyl and $C_{1-4}$-alkoxy and in formula (II) at least 25% of the symbols m are 1, or a mixture thereof.

* * * * *